United States Patent [19]

Bedini et al.

[11] 4,161,653
[45] Jul. 17, 1979

[54] CONTROL CIRCUIT FOR REAR VIEW MIRRORS PROVIDED WITH A LIQUID CRYSTAL CELL

[75] Inventors: Remo Bedini, Pisa; Danilo De Rossi, S. Giuliano Terme, both of Italy

[73] Assignee: FIAT Societa per Azioni, Turin, Italy

[21] Appl. No.: 880,743

[22] Filed: Feb. 24, 1978

[30] Foreign Application Priority Data

Feb. 25, 1977 [IT] Italy ............................... 45207 A/77

[51] Int. Cl.² .............................................. H01J 39/12
[52] U.S. Cl. .................................... 250/215; 350/331; 350/332
[58] Field of Search ........................... 250/215, 213 R; 350/331, 332

[56] References Cited

U.S. PATENT DOCUMENTS 3,614,210 10/1971 Caplan ............................ 350/331 X Primary Examiner—David C. Nelms
Assistant Examiner—Darwin R. Hostetter
Attorney, Agent, or Firm—Sughrue, Rothwell, Mion, Zinn and Macpeak

[57] ABSTRACT

An anti-dazzle rear view mirror incorporates a liquid crystal cell the conductive layers of which are energized by a control voltage in response to light above a threshold intensity impinging on a photoresistor in the control circuit of the cell. A low voltage source, for example a vehicle 12 volt battery, supplies a potential divider which includes the photoresistor, the voltage across which is connected through a logic invertor which controls two logic NAND gates for gating anti-phase square wave outputs derived from an oscillator driven from the source to the respective conductive layers of the cell, thereby producing a square-wave voltage across the cell which is double the amplitude of the oscillator output, and decreasing the time taken for the liquid crystal cell to respond to the light intensity change.

1 Claim, 4 Drawing Figures

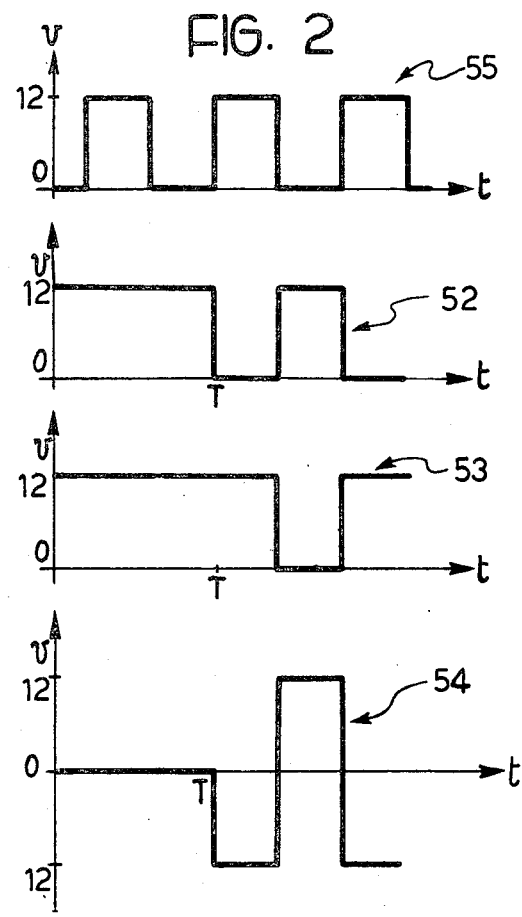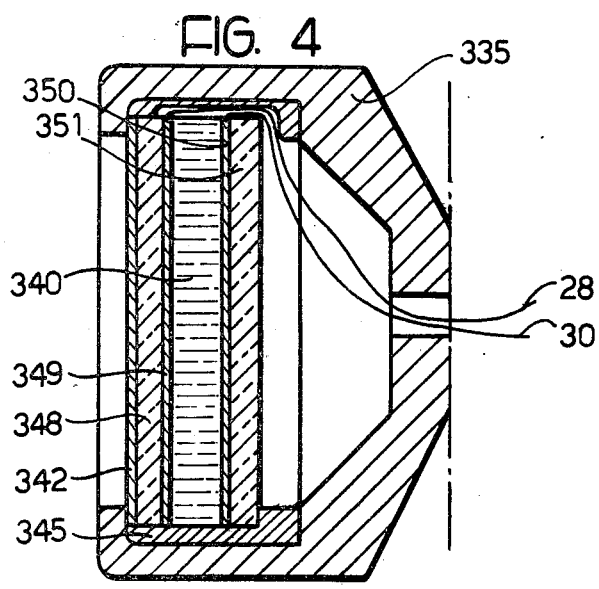

CONTROL CIRCUIT FOR REAR VIEW MIRRORS PROVIDED WITH A LIQUID CRYSTAL CELL

The present invention relates to rear view devices for motor vehicles of the type comprising a rear view mirror having a liquid crystal cell disposed in front of the reflecting surface of the mirror and an electric control circuit supplied by the vehicle battery for applying a voltage between conductive layers on the internal surfaces of opposite walls of the cell when the intensity of the luminous radiation which impinges on the mirror exceeds a predetermined threshold value, so as to convert the cell from a condition of low to a condition of high luminous attenuation.

The speed of response of a liquid crystal cell is substantially proportional to the square of the voltage applied to the cell so that, in rear view devices of the aforesaid type, the problem arises of increasing the voltage at the output of the control circuit relative to the low voltage supplied by the vehicle battery, in order to reduce the time taken for the cell to pass from the condition of reduced attenuation to the condition of high attenuation, thereby adapting the device to the practical exigencies of road traffic.

In the Applicants' Italian Patent Application No. 67156-A/77 a solution to the abovementioned problem is proposed in which the electric control circuit of a liquid crystal cell for a motor vehicle rear view mirror includes a transformer which applies to the cell a voltage higher than that of the vehicle battery.

The use of a transformer, however, makes the control circuit cumbersome and costly, and does not enable the control circuit to be produced with a compact size so as to take advantage of integrated circuit technology, which would in many cases be desirable.

The present invention, with a view to avoiding the aforementioned disadvantages, provides a control circuit for controlling the potential difference applied to conductive layers of a liquid crystal cell forming part of a rear view mirror for motor vehicles, said circuit being supplied from a direct current low voltage source, characterized in that the control circuit comprises, in combination: a resistive potential divider, supplied from said source and comprising a resistance and a photoresistor; a logic invertor, connected in parallel with the photoresistor, to invert the voltage across the photoresistor; an oscillator supplied from said source for generating a square wave; a first logic NAND gate having a first input connected to the oscillator, a second input connected to the output of the logic invertor and an output; a second logic NAND gate having a first input connected to the output of the first NAND gate, a second input connected to the output of the logic invertor and an output; a conductor connecting the output of the second logic NAND gate with one of the conductive layers of the liquid crystal cell; and a conductor connecting the output of the first logic NAND gate with the other conductive layer of the liquid crystal cell, whereby, when the photoresistor is activated, the voltage between the conductive layers of the liquid crystal cell has a peak-to-peak amplitude double the amplitude of the square wave generated by the oscillator.

The control circuit of the invention allows a voltage to be established between the conductive layers of the liquid crystal cell which is double the voltage of the direct current supply source, without employing a transformer.

The invention will be further described, by way of non-limiting example, with reference to the accompanying drawings, in which:

FIG. 2 is a diagram illustrating the waveforms at various points in operation of the circuit of FIG. 1;

FIG. 4 illustrates a variant of the mirror shown in FIG. 3.

Figure 1:
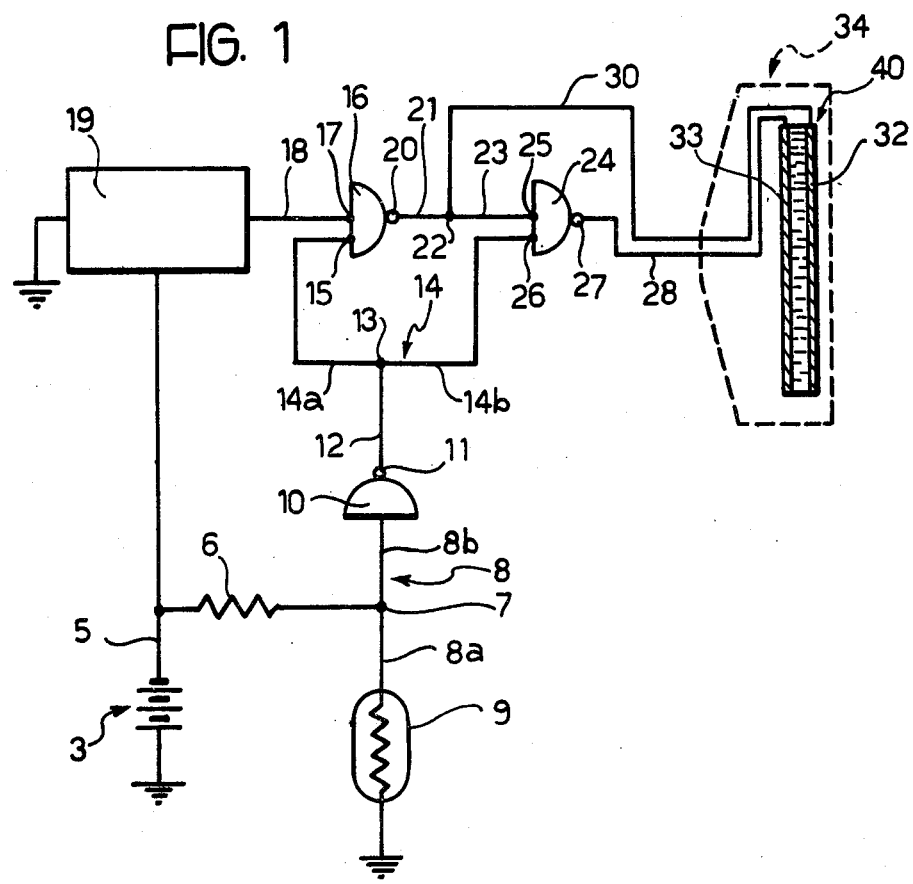
FIG. 1 is a schematic diagram of a control circuit according to one embodiment of the invention.

In FIG. 1 reference numeral 3 indicates a motor vehicle battery which constitutes a direct current source at a low voltage of, for example, 12 volts. The positive pole of the battery 3 is connected through a conductor 5 to a resistance 6 (typically 100 Kohm) to a point 7 of a conductor 8. A branch 8a of the conductor 8 is connected to earth through a photoresistor 9. A branch 8b of the conductor 8 is connected to a logic invertor 10 which inverts the signal present on the branch 8a in the following way. If the voltage at the input of the invertor 10 has a value close to zero, the voltage at the output 11 of the invertor 10 is close to 12 volts, that is, the supply voltage of the circuit. If, on the other hand, the input voltage of the invertor 10 is close to 12 volts (for example, between 6 and 12 volts) the output 11 will be at zero voltage.

The output 11 of the logic invertor 10 is connected through a conductor 12 to a point 13 in a conductor 14. One branch 14a of the conductor 14 is connected to a first input 15 of a first logic NAND gate 16 having two inputs 15, 17. The output 20 of the NAND gate 16 is held at a high logic level, close to the supply voltage (12 volts) if one of its two inputs is at zero voltage level and allows the inverted signal present on one input to pass if the other input is at a high logic level. The second input 17 of the gate 16 is connected, through a conductor 18, to a square wave oscillator 19 driven by the battery 3. The waveform generated by the oscillator 19 is indicated at 55 in FIG. 2.

The output 20 of the NAND gate 16 is connected through a conductor 21 to a point 22, which is connected through a conductor 23 to a first input 25 of a second logic NAND gate 24. The point 12 is connected through a branch 14b of the conductor 14 to the input 26 of the gate 24. The output 27 of the gate 24 and the point 22 are connected, through respective conductors 28 and 30, to the conductive transparent layers 32 and 33 respectively on opposite internal surfaces of parallel walls of a liquid crystal cell 40 incorporated in a rear view mirror 34 of a motor vehicle.

Figure 3:
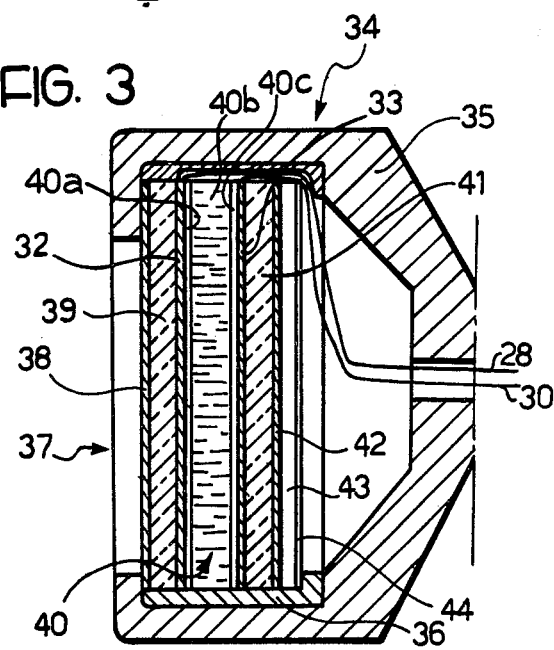
FIG. 3 illustrates schematically a rear view mirror for motor vehicles having a liquid crystal cell controlled by the circuit of FIG. 1.

The mirror 34 is formed, as illustrated in FIG. 3, by a casing 35 which supports, through an interposed packing 36, a sandwich structure 37 formed by a plane polarizing filter 38 backed by a front glass plate 39 the rear face of which is coated with a layer of transparent conductive material 32. The conductive layer 32 is in contact with a liquid crystal contained in the cell 40. The cell 40 has a rear glass plate 41 parallel to the plate 39 and coated on its front face with a layer of transparent conductive material 33, in contact with the liquid crystal in the cell. The rear plate 41 is backed by a plane polarizing filter 42 mounted with its optical axis crossed at 90° with respect to that of the filter 38. The filter 42 is in turn backed by a mirror formed by a glass sheet 43 having on its rear face a coating of reflective material 44.

The liquid crystal filling of the cell is made up of a layer 40a of silicon monoxide deposited obliquely by evaporation under vacuum upon the conductive layer 32, a layer 40b of nematic liquid crystal with twisted molecular configuration of the type displaying positive dielectric anisotropy, formed for example by a mixture of methoxybenzylidene-butylaniline and ethoxybenzilidene-butylaniline, and a layer 40c of silicon monoxide deposited obliquely by evaporation under vacuum on the conductive layer 33 at an angle of 90° to the obliquely deposited layer 40a.

The operation of the device herein described will now be described.

When the photoresistor 9 is illuminated by light having an intensity lower than a predetermined threshold (dependent upon the ratio between the values of the resistance 6 and of the photoresistor 9), the voltage level at the input of the invertor 10 coincides with logic level 1 (voltage greater than 6 volts and lower than 12 volts). The photoresistor 9 has a resistance of about 1000 Kohms, that is, higher than the value of the resistance 6, in the interval of time represented by 0–T in the four waveforms 52, 53, 54, 55 of FIG. 2. In these conditions the invertor 10 has an output at logic level 0, holding the outputs of the gates 16 and 24 at a logic level 1. The potential difference between the conductive layers 33 and 32 of the liquid crystal cell 40, represented by the waveform 54, is equal to the difference instant by instant between the waveforms 52 and 53 respectively at the output 20 of the gate 16 and at the output 27 of the gate 24 respectively, this difference being equal to zero in the interval 0–T. In this case the electric field between the conductive layers 32 and 33 is zero and the cell 40 does not change its optical response. If for example at the instant T the photoresistor 9 is illuminated by luminous radiation of an intensity higher than the predetermined threshold, its ohmic resistance decreases (to about 500 ohm), and the input voltage of the invertor 10 shifts to a logic level 0, the voltage at its output 11 shifting to logic level 1. The logic gates 16 and 24 therefore open and pass the oscillatory voltage from the oscillator 19. The inverting gate 24 inverts the phase of the oscillatory voltage 52 at the output of the gate 16. This results in a voltage between the conductive layers 32, 33 of the cell 40 with a waveform 54 which, after the instant T, is a square wave oscillating with a mean value of zero volts with a peak-to-peak amplitude which is double the voltage amplitude of the waveforms 52 and 53, that is, 24 volts in this example.

There is therefore established an electric field between the conductive layers 32, 33 under the influence of which the liquid crystal cell 40 commutes its optical response into the condition in which the luminous attenuation of the cell is increased. When, for example, at an instant T¹ later than T, the luminous intensity of the incident radiation returns below the predetermined threshold, the conditions previously described for the interval 0–T are restored, so that the potential difference across the cell 40 becomes zero, and the cell reverts to the state of low luminous attenuation.

In the variant illustrated in FIG. 4 a rear view mirror 334 is shown which has a casing 335 supporting, through a packing 345, a sandwich structure including a circular polarizing filter 347 backed by a front glass plate 348, on the rear face of which a layer 349 of transparent conductive material is deposited which is electrically connected to the control conductor 28 of FIG. 1. The layer 349 is in contact with a liquid crystal material 340. The liquid crystal cell has a rear glass plate 351 on the front face of which a layer 350 of reflective electrically conducting material is deposited, in contact with the liquid crystal material 340. The layer 350 is electrically connected to the conductor 30 of the control circuit.

It will be understood that practical embodiments of the invention can be widely varied with respect to what has been described and illustrated by way of example, without departing from the scope of this invention.

We claim:

1. Control circuit for controlling the potential difference applied to conductive layers of a liquid crystal cell forming part of a rear view mirror for motor vehicles, said circuit being adapted to be supplied from a direct current low voltage source, and comprising, in combination:

resistive potential divider means, connectible to said source and including a resistance and a photoresistor;

a logic invertor, connected in parallel with the photoresistor, to invert the voltage across the photoresistor;

oscillator means connectible to said source for generating a square wave;

a first logic NAND gate having a first input connected to the oscillator, a second input connected to the output of the logic invertor and an output;

a second logic NAND gate, having a first input connected to the output of the first NAND gate, a second input connected to the output of the logic invertor and an output;

conductor means connecting the output of the second logic NAND gate to one of the conductive layers of the liquid crystal cell; and further conductor means connecting the output of said first logic NAND gate to the other conductive layer of the liquid crystal cell, whereby, when the photoresistor is activated, in use of the circuit, by incident light in excess of a predetermined threshold intensity, the voltage between the conductive layers of the liquid crystal cell has a peak-to-peak amplitude double the amplitude of the square wave generated by the oscillator means.

* * * * *